Sept. 2, 1941.   F. AULD   2,254,928

ALTERNATING-CURRENT MOTOR STARTING SYSTEM

Filed March 31, 1938   4 Sheets-Sheet 1

WITNESSES:
E. A. McCloskey
[signature]

INVENTOR
Frederick Auld.
BY Paul E. Friedemann
ATTORNEY

Sept. 2, 1941.　　　　　　　F. AULD　　　　　　　2,254,928
ALTERNATING-CURRENT MOTOR STARTING SYSTEM
Filed March 31, 1938　　　　4 Sheets-Sheet 2

WITNESSES:
E. A. McCloskey.
Nw. C. Groome

INVENTOR
Frederick Auld.
BY
Paul E. Friedemann
ATTORNEY

Sept. 2, 1941.   F. AULD   2,254,928
ALTERNATING-CURRENT MOTOR STARTING SYSTEM
Filed March 31, 1938   4 Sheets-Sheet 3

WITNESSES:
E. A. McCloskey
Nur. C. Groome

INVENTOR
Frederick Auld.
BY
Paul E. Friedemann
ATTORNEY

Sept. 2, 1941.　　　　　F. AULD　　　　　2,254,928
ALTERNATING-CURRENT MOTOR STARTING SYSTEM
Filed March 31, 1938　　　4 Sheets-Sheet 4
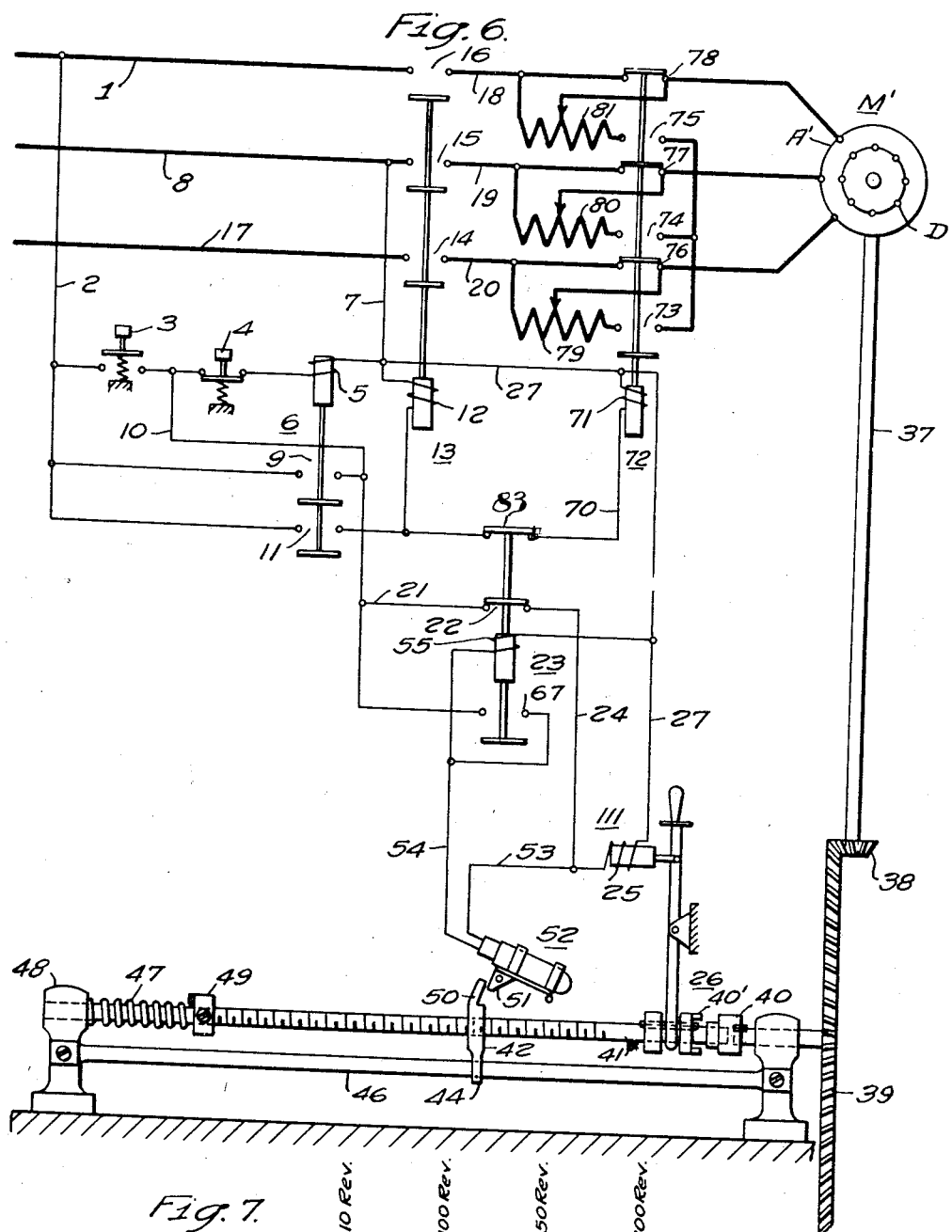
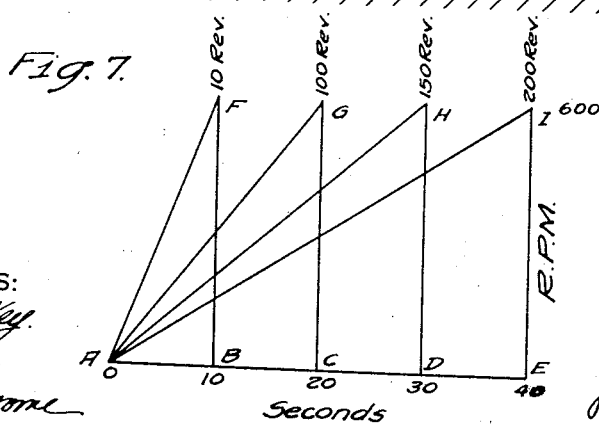
WITNESSES:
INVENTOR
Frederick Auld.
BY
Paul E. Friedemann
ATTORNEY Patented Sept. 2, 1941

2,254,928

UNITED STATES PATENT OFFICE 2,254,928

ALTERNATING-CURRENT MOTOR STARTING SYSTEM

Frederick Auld, Charleston, W. Va., assignor to Westinghouse Electric & Manufacturing Company, East Pittsburgh, Pa., a corporation of Pennsylvania Application March 31, 1938, Serial No. 199,234

20 Claims. (Cl. 172—289)

My invention relates to electric control systems, more particularly to systems of control for effecting the automatic starting of alternating current motors.

Automatic starting systems for alternating current motors are well known. Such known starting schemes, or systems, depend either on time or on the current in the motor windings to control the starting of the motor.

If the alternating current motor is a synchronous motor, the frequency of the current in the field winding may be utilized to control the instant of application of the direct current excitation to the field winding. With induction motors, the frequency in the secondary winding may also be used. In general, some current characteristic of the current in the armature, field, primary, secondary, or damper windings can be used. The best known of these schemes is the field frequency scheme.

With a time limit system of control some sort of timing devices are used which allow a definite time to elapse between the application of the voltage to the primary windings and the establishment of the running circuits for the motor. For a synchronous motor the application of the voltage to the armature or the application of the field excitation, or both, may be controlled by the timing device, or devices, and for an induction motor the voltage to the primary or the secondary resistance or both, may be controlled by the timing device, or devices.

The use of a time limit control may for most motor loads be too slow, thus requiring the motor to run with its starting circuits energized too long. If the time limit is selected shorter to provide for more rapid starting then it may happen, when the motor is heavily loaded, that heavy surges are produced on the supply and the motor and the load driven thereby may be subjected to shocks during starting. With a field frequency scheme, if the load is heavy, the motor may fail to come up to full speed.

One object of my invention is the provision of a starting scheme for an alternating current motor that partakes of the merits of both the time limit scheme and the current scheme without being subject to the disadvantages of either of the schemes.

A broad object of my invention is to utilize a given number of revolutions made by a motor, after the instant of its energization, to control the starting of a motor.

A more specific object of my invention is to control the transfer of a motor from its starting connections to its running connections in response to a given number of revolutions made by the motor after the establishment of its starting connections.

It is also an object of my invention to alter the energization of an alternating current motor as a function of a revolution counting means set in operation to count motor revolutions the instant the electric motor controlled starts rotating.

The foregoing recitation of objects of my invention is by no means exhaustive but is merely illustrative of the objects of my invention. Other objects will readily become more apparent from a study of the following specification when taken in conjunction with the accompanying drawings, in which:

Fig. 6 is a graphic presentation of hypothetical starting characteristics of a motor, to aid in explaining the advantages of my invention; and Fig. 7 is a diagrammatic showing of my invention as applied to an induction motor.

Figure 1:
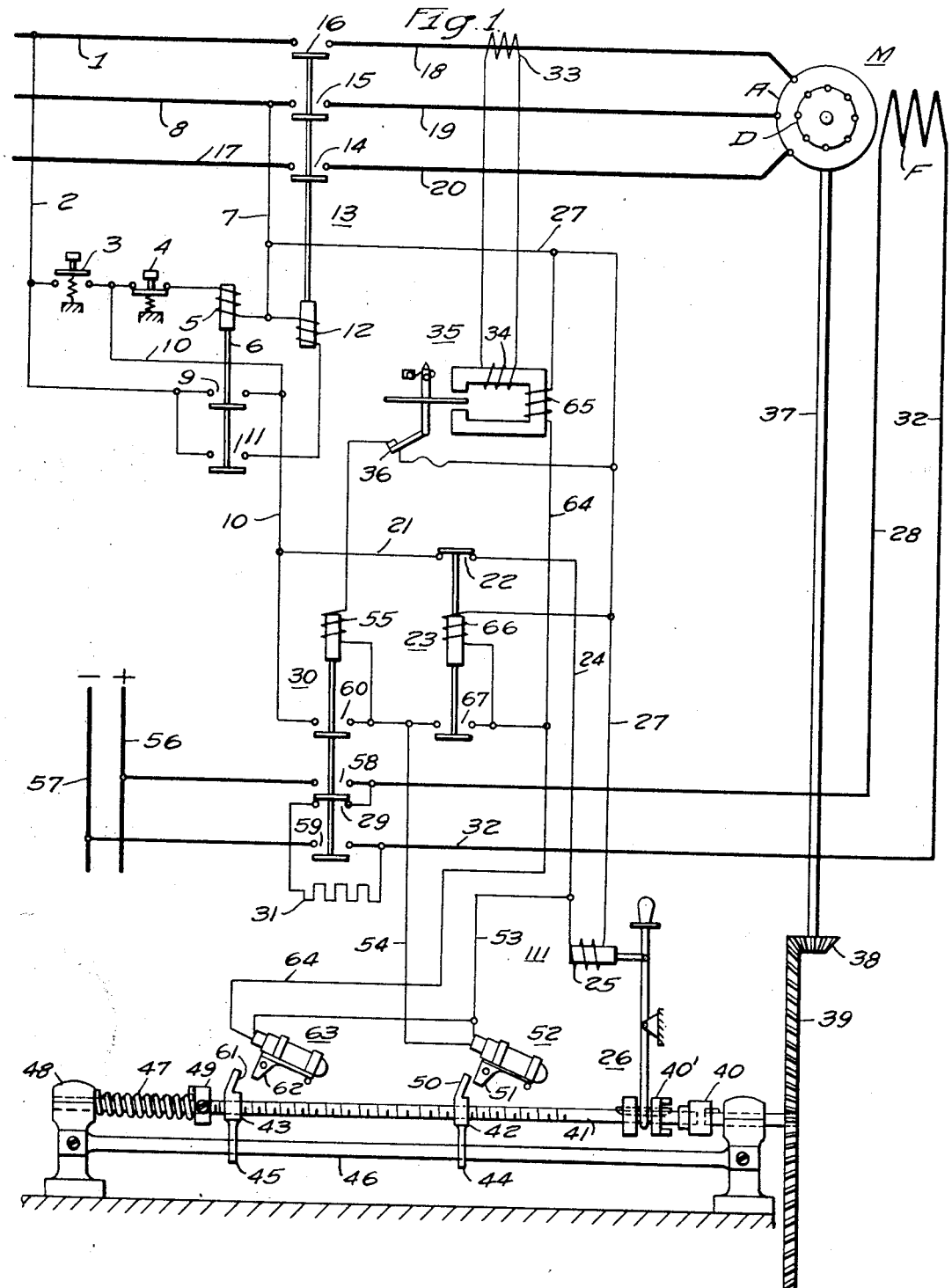
Figure 1 is a diagrammatic showing of my invention as applied to a synchronous motor started on full voltage.

Before describing the details of my invention, some general theoretic explanations and an analysis of a starting cycle of a motor may be helpful. Let it be assumed that a 600 R. P. M. synchronous motor is to be started, that is, brought up to synchronous speed.

In Fig. 7, I have plotted revolutions per minute against time in seconds using accelerating periods of 10, 20, 30, and 40 seconds. For simplicity, let it be assumed the motor rotor will accelerate on the damper winding to synchronous speed and that the acceleration will be uniform, that is, that lines OF, OG, OH, and OI are straight lines. As will appear hereinafter, any variations from this assumption will have no unfavorable effect on the principle involved.

In the case of the 10 second period, the average speed is 300 R. P. M., or 5 R. P. S. and the total number of revolutions while the motor accelerates to 600 R. P. M., the full speed, is 5 times 10 or 50 revolutions.

From similar calculations, it is apparent that the total number of revolutions made during each of the 20, 30, and 40 second periods is 100, 150, and 200, revolutions, respectively.

Now the number of revolutions made during any accelerating period is proportional to the areas ABF, ACG, ADH, etc. In fact if the time be expressed in minutes then the area is equal to the number of revolutions being the product of the average revolutions per minute and the time.

The field frequency starting scheme, or for that matter, any current responsive scheme uses revolutions per minute only, whereas any time limit starting scheme uses time only. By using the combination of time and revolutions per minute, I get the useful characteristics of both starting methods.

Let me assume I know definitely that a motor, connected to a given load, will accelerate in exactly 10 seconds. With a time limit starting scheme I could set the devices for 10 seconds and at the expiration of that time the rotor will have acquired a maximum speed and, considering a synchronous motor, the field excitation is automatically applied. This would be ideal. But as a matter of fact, no one ever knows the exact time required for each acceleration. Therefore, in order to make sure that the rotor may have sufficient time to reach maximum speed, the procedure is usual to set the control relay for a longer period than will be required, as for instance 20 seconds. But suppose the rotor does actually come up to full speed in 10 seconds, then the motor, though up to speed, must continue to operate on the damper windings for an additional 10 seconds.

With my system of control if the control means, including a revolution counter, is set for 100 revolutions, which corresponds to 20 seconds on Fig. 7, the rotor would have made 50 revolutions while coming up to speed. The rotor is now operating at 600 revolutions per minute and the time required to make the additional 50 revolutions is 5 seconds so that the control, or transfer operations, as the application of the field, occurs in 15 seconds instead of 20 seconds.

In like manner, it will be apparent that had the setting been made for 150 revolutions, the field would have been applied in 20 seconds and with a 200 revolution setting in 25 seconds assuming in each case that the rotor actually comes up to full speed in 10 seconds. It is now apparent that any variation from the straight line acceleration which I assumed originally and which is graphically represented in Fig. 7 would only increase or decrease slightly the number of revolutions made during acceleration, thus decreasing or increasing slightly the number of revolutions made after the accelerating period.

From the foregoing discussion, it is apparent that my starting scheme will to some extent automatically adjust the time to suit the actual time required for acceleration. In this respect, my scheme has somewhat the characteristics of the field frequency scheme.

My scheme, in addition to being of value for starting synchronous motors, is of considerable value in reduced voltage starting for induction motors as it would relieve the auto-transformer of unnecessary load due to incorrect setting of the control time relay.

My scheme also has the advantages of the definite time scheme in that it utilizes the maximum speed to which the damper winding would bring the rotor and in no case will it fail to apply the field in a relatively short time. With this inherent time adjustment found in my starting control, settings for different accelerating times are not necessary. One setting is made for the most severe condition and for less severe conditions the time is automatically shortened.

To provide a starting control based upon the starting theory I advance, some simple form of revolution counter is necessary. Such a revolution counter should at least have the following characteristics, it should be simple and positive in its operation, rugged in construction and low in cost, it should automatically come into operation on closing the starting circuit, close a control switch on completion of the number of revolutions for which it is set and then reset itself automatically and instantly.

Figure 2:
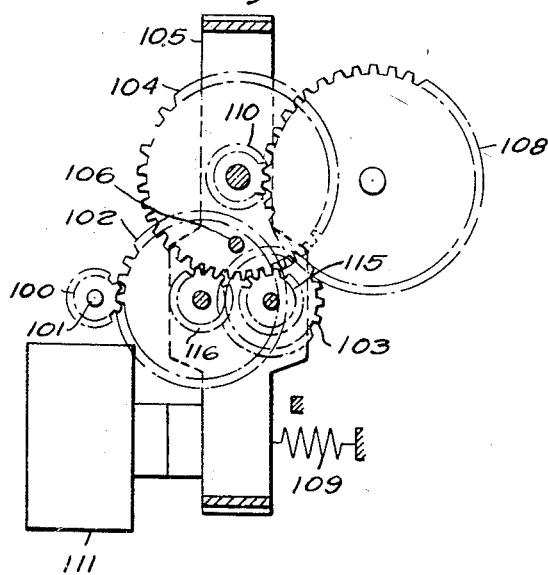
Fig. 2 is a sectional view taken along line II—II of Fig. 3 of a revolution counting mechanism constituting part of my invention.
Figure 4:
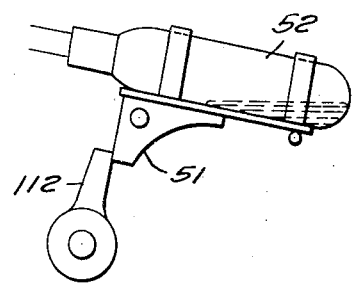
Fig. 4 is a side view of one of the mercoid switches operated by the revolution counting device shown in Figs. 2 and 3.
Figure 3:
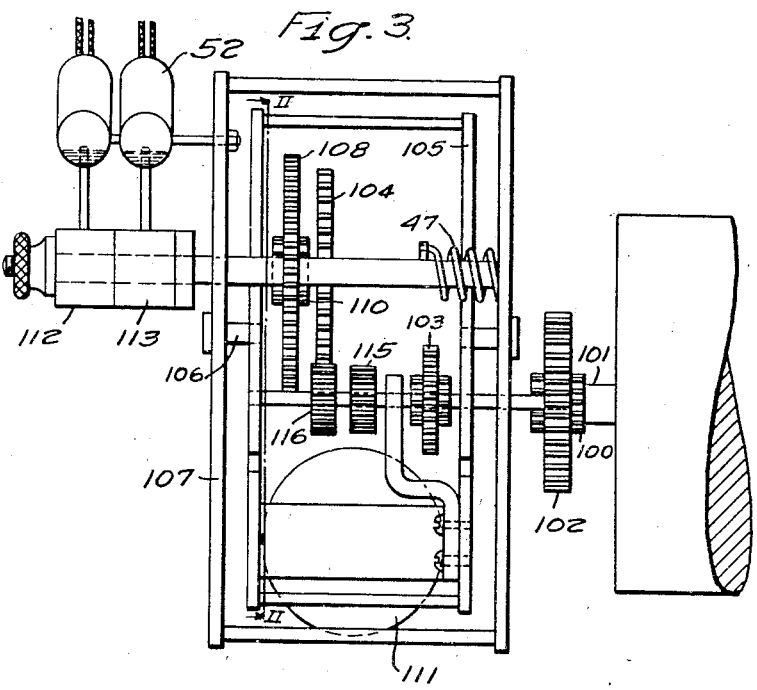
Fig. 3 is a front view of the subject matter shown in Fig. 2.

There are probably a number of ways in which these results may be obtained. In Figs. 2 and 3, I show a simple and rugged device which I believe meets all of the requirements hereinbefore mentioned. For the particular showing I have made of the revolution counter, the sizes of the various gears have been selected on the assumption that a maximum of 200 revolutions is required for the accelerating period, namely, a maximum period of 40 seconds for a 600 R. P. M. motor. This is, of course, only to be taken as illustrative because with a motor having a different normal speed, the gear reduction will be different.

Referring to Fig. 3, the small pinion 100 is mounted on the motor shaft 101 and meshes with the larger gear 102 which drives a gear train that has a total gear ratio of 200:1. Gears 102, 103 and 104 are mounted in a frame 105 which is pivoted at a point 106 midway between the bearings of gears 102, 103 and 104 to a stationary frame 107. Gear 108 has its bearings in the stationary frame. When the revolution counter is not in operation, the spring 109 holds pinion 100 and gear 102 and pinion 110 and gear 108 out of mesh. The revolution counter is provided with a solenoid 111 or coil which is connected in the electric circuit to be hereinafter described so as to be energized when the starting circuit is established. When this solenoid 111 is energized, gear 102 is thrown into mesh with pinion 100 and pinion 110 is thrown in mesh with the gear 108.

On the shaft of gear 108 are mounted two dogs 112 and 113 which can be set at any angular position on the shaft. Mounted above these dogs and secured to the frame 107 are two small mercoid switches which are pivoted so that they may be tilted by dogs 112 and 113, respectively. One of these mercoid switches is arranged in the control circuit to be described to control the energization of the field contactor and the other mercoid switch is arranged to energize a power factor relay when used with the system of control, which energization of the power factor relay takes place through an intermediate relay. The arrangement is such that once the mercoid switch last to operate has operated, the solenoid 111 is deenergized and in consequence the spring 109 disengages the gear wheels with the result that spring 47 mounted on the shaft of the gear 108 repositions all of the gears of the revolution counter to their original position so that the revolution counter stands ready to repeat its operation of controlling the starting of whatever motor or system of control it may be arranged to serve.

By shifting gear 104 on its shaft so that it meshes with pinion 115 instead of pinion 116, the gear ratio can be changed from a 600:1 which corresponds to an accelerating period of 40 seconds for a motor having a full speed of 1800 R. P. M.

Fig. 1 is a diagrammatic showing of a system of control and a motor, the accelerating period of which is being controlled by a revolution counter. To simplify the discussion the revolution counter shown in Fig. 1 has been shown quite schematic.

In operation, the revolution counter shown at the bottom of Fig. 1, is set in operation the instant the main switch 13 for the motor M is operated and after a predetermined number of revolutions have been counted by the revolution counter, the mercoid switch 52 is caused to tilt by the dog 50 with the result that the field contactor 30 is caused to operate to change the field connection from a starting connection through a discharge resistor 31 to a running connection for energization from the direct current buses. As soon as the motor has pulled into synchronism, the second mercoid switch, which is normally set to operate for a higher number of revolutions, is operated which causes the operation of control relay 23 and the energization of the power factor relay 35. Operation of the control relay 23 deenergizes the solenoid for the revolution counter which thereupon resets itself to stand ready at any subsequent time to control the starting of the motor M.

A better understanding of my invention can probably be had from a study of a typical starting sequence for a motor. Assuming the attendant wishes to start the motor M and assuming that the direct current buses 56 and 57 as well as the alternating current buses 1, 8 and 17 are provided with a direct current potential and the alternating current potential respectively, and the attendant depresses the starting push button switch 3 then a circuit is established from the bus 1 through conductor 2, starting push button switch 3, stop switch 4, actuating coil 5 of the low voltage control contactor 6, conductor 7 to the bus 8. Operation of the contactor 6 causes the closing of contact members 9 and 11 whereupon a holding circuit is established for coil 5 through contactor 9 and conductor 10. Operation of the low voltage control contactor 6 also causes the closing of the contact members 11 whereupon a circuit is established from the energized conductor 2 through contact members 11, the actuating coil 12 of the main contactor or switch 13 to the energized conductor 7. Operation of the main contactor 13 causes the closing of the contact members 14, 15 and 16, thereby connecting the motor leads 18, 19 and 20 to the buses 1, 8 and 17 with the result that the armature A of the motor M is energized.

Simultaneously with the energization of the actuating coil 12 a circuit is established from the energized conductor 10 through conductor 21, back contact members 22 of the control relay 23, conductor 24, actuating coil 25 of the solenoid 111, conductor 27 to the energized conductor 7.

At the instant alternating current is supplied to the armature A, currents of line frequency are induced in the damper windings D and the field windings F and the motor begins to operate. The alternating current induced in the filed winding F is discharged through the discharge resistor 31 by a circuit which may be traced from the left-hand terminal of the field winding F through conductor 28, back contact members 29 of the field contactor 30, discharge resistor 31 and conductor 32 to the right-hand terminal of the field winding F. Simultaneously with the energization of the field winding in the manner just described, the secondary winding 33 of a current transformer is energized, thereby energizing the coil 34 of the power factor relay 35. The arrangement, however, is such that the energization of the coil 34 at this stage does not effect the opening of the switch 36 controlled by the power factor relay 35.

The instant the motor M starts rotating shaft 37 is rotated, thereby operating the bevelled pinion 38 and the gear 39 and the clutch member 40 on the shaft of the gear 39. Since coil 25 of the solenoid 111 is energized, the clutch mechanism 26 will have actuated the clutch jaws 40' to engage the clutch member 40 to thus operate the shaft 41. The nuts 42 and 43 will thus be caused to shift on the threaded shaft 41, since these nuts are prevented from rotating on the shaft by the guide member 46 engaging the bifurcated stems 44 and 45 of the nuts 42 and 43, respectively. The shaft 41 has a lug 49 rigidly secured to it and disposed intermediate the lug 49 and the bearing 48 is a spring 47 which may be caused to unwind when the shaft 41 is operated, thereby causing the shaft 41 to automatically reposition itself to its original position as soon as the clutch jaws 40' and 40 are caused to disengage by reason of a deenergization of the actuating coil 25.

As the motor accelerates, the revolution counter immediately begins to count revolutions and the total number of revolutions the motor has made at any instant after its starting is indicated by the change in position of the nuts 42 and 43. After the motor has made a predetermined number of revolutions, the dog 50 engages the dog 51 to tilt the mercoid switch 52 whereupon a circuit is established from the energized conductor 24 through the conductor 53, mercoid switch 52, conductor 54, actuating coil 55 of the field contactor 30, switch 36 of the power factor relay 35 to the energized conductor 27. Energization of the coil 55 of field contactor 30 causes the operation of this contactor to thus connect the field winding F to the buses 56 and 57 through the contact members 58 and 59.

Immediately after the contact members 58 and 59 are closed, contact members 29 are open to thus open the starting or discharge circuit for the field winding F. Operation of the field contactor 30 also causes the closing of contact members 60 whereupon a holding circuit is established for the actuating coil 55.

Energization of the field winding F with direct current causes the motor M to synchronize and thus operate at substantially unity power factor. The revolution counter, however, continues to operate to move the nuts 42 and 43 towards the right until eventually for some other predetermined number of revolutions dogs 61 and 62 engage each other to thus tilt the mercoid switch 63, whereupon a circuit is established from the energized conductor 53 through mercoid switch 63, conductor 64 through the voltage coil 65 of the power factor relay 35. Since, however, the motor has synchronized, switch members 36 remain closed. Operation of the mercoid switch 63 establishes another energizing circuit which may be traced through mercoid switch 63, conductor 64, actuating coil 66 of the control relay 23. Operation of the control relay 23 causes the closing of contact members 67 which establish a holding circuit for the actuating coil 66 and an instant thereafter the back contact members 22 are opened whereupon the actuating coil 25 of the solenoid 111 of the revolution counter is deenergized to thus declutch the shaft 41 from the gear 39 with the result that the spring 47 automatically resets the nuts 42 and 43 to their original position.

My system of control is also of value for resynchronization. If for any reason the motor pulls out of step, the power factor relay will be caused to operate the switch 36 to thus deenergize the coil 55 of the field contactor 30 and thus reestablish the discharge circuit for the field winding F and also open the contact members 60. Opening of the contact members 60 opens the holding circuit for the actuating coil 66 of the control relay 23 with the result that back contact members 22 are closed. Coil 25 thus becomes reenergized and the starting cycle is reenacted and the motor is thus brought up to synchronism.

My invention is also of utility in controlling not only the application of the direct-current excitation to the field winding in response to the operation of a revolution counter but also to control the line voltage supplied to the armature of the motor in response to a revolution counter.

Synchronous motors that are started on low voltage and then transferred to full voltage may either be synchronized before the full voltage is applied or after the full voltage is applied. In the first instance, synchronization takes place before full line voltage is supplied to the motor, whereas in the second case synchronization does not take place until after the motor is supplied with full line voltage. The theory of operation of my invention for controlling the voltage applied to a motor is the same regardless of which order is used. It will be noted, therefore, referring to Fig. 5, that nut 43 which controls the mercoid switch 63 is so positioned on shaft 41 that the actuation of the mercoid switch 63 occurs after the direct current excitation is applied to the field winding F.

Figure 5:
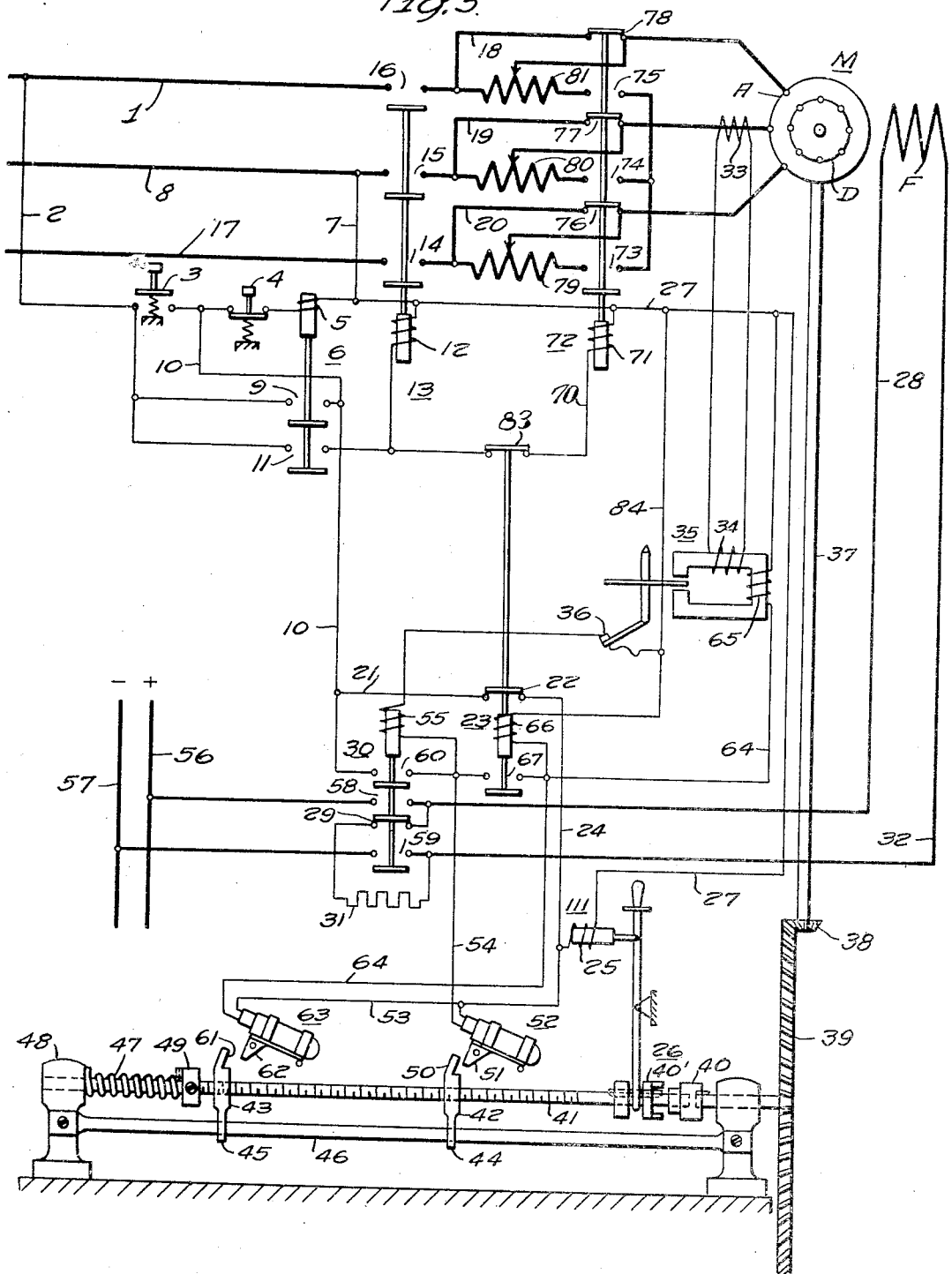
Fig. 5 is a diagrammatic showing of my invention as applied to a low-voltage starting scheme for a synchronous motor.

In the showing in Fig. 5, the mercoid switch 63 again controls the energization of the control relay 23 as well as the energization of the voltage coil 65 of the power factor relay 35 but the control relay 23 in the showing in Fig. 5 has the additional function of opening the contact members 83.

To determine the utility of this operation, let us assume that the starting cycle has been carried to the point where the main line switch 13 is energized, namely, to the point where contact members 11 are closed. Closure of contact members 11 establishes a circuit through conductor 70, actuating coil 71 of the contactor 72 to the energized conductor 27. Operation of the contactor 72 causes the closing of contact members 73, 74 and 75, thereby connecting the armature A of the motor M to the buses 1, 8 and 17 through the auto-transformers 79, 80 and 81. Operation of contractor 72 also causes the opening of contact back members 76, 77 and 78 so that the armature is not directly energized from the leads 18, 19 and 20.

When contact members 83 open, as hereinbefore pointed out, the circuit for the actuating coil 71 of contactor 72 is interrupted. As a result, the auto-transformers are disconnected and contact members 76, 77 and 78 close, thereby applying full voltage to the motor M.

In Fig. 6, I show a starting control for an induction motor M'. Since there is no field circuit associated with an induction motor, the second mercoid switch 63 is not utilized. The function of the transfer from low voltage to high voltage is exactly as shown in Fig. 5 and no further detailed analysis of the operation of the system shown in Fig. 6 is thought to be necessary. It should be noted, however, in connection with the various modifications I have shown that these are not exhaustive but are merely given to illustrate my invention, because it is readily apparent, for instance in Fig. 6, that an additional mercoid switch might be used to control the resistance of the secondary circuit of a wound rotor induction motor.

I do not wish to be limited, therefore, to the specific showings I have made in this disclosure, because it is readily apparent that those skilled in the art particularly after having had the benefit of the teachings of my invention, can devise other circuit diagrams for accomplishing the same result. I, therefore, wish to be limited only by the scope of the claims hereto appended and such prior art as may be pertinent.

I claim as my invention:

1. In a starting system for an alternating current motor, a source of alternating current therefor having low voltage starting and full-voltage running taps, and means responsive to the number of revolutions of the motor after starting adapted to automatically control the transfer of the motor armature from the low-voltage starting taps to the full-voltage running taps.

2. In a starting system for a synchronous motor having armature windings, a source of alternating current for the motor, said source having low-voltage starting taps and full-volts running taps, and control means responsive to a given total number of revolutions of the motor after connection to said low-voltage starting taps adapted to automatically control the transfer of the motor armature windings from the low-voltage starting taps to the full-voltage running taps.

3. In a starting control for automatically starting an electric motor, in combination, a synchronous motor having an armature winding and a field winding, means for applying alternating current to the armature winding, a source of direct current, a resistor, a two-position switch arranged so that in one position it connects said resistor across the field winding and in the other position it connects the source of direct current to the field winding, and control means, responsive to a given total number of revolutions the motor makes after the armature is supplied with alternating current, adapted to disconnect said resistor from the field winding and to connect the source of direct current to the field winding.

4. In a motor starter, the combination of, a synchronous motor having an armature winding and a field winding, a source of alternating current, switching means for connecting the armature to the source of alternating current, a source of direct current, switching means for connecting the field winding to the source of direct current, and control means, including a revolution counter set in operation the instant the source of alternating current is connected to the armature, adapted to cause the operation of the last named switching means when the motor has made a given total number of revolutions after the operation of the first named switching means.

5. In a motor starting system of the type described, the combination with a motor having a field winding, a source of excitation for the field winding, a switch for connecting the field winding to said source of excitation, means for energizing the motor to start the motor, and control means responsive to a given total number of revolutions of the motor, after starting of the motor, adapted to effect the operation of said switch to thus connect the field winding to the source of direct current.

6. In a motor starter, the combination with an alternating current motor having circuits that include starting and running connections, a source of alternating current, switching means for effecting the energization of said motor and for effecting a transfer from the said starting connections to said running connections and control means responsive to the number of revolutions of the motor, after starting of the motor, adapted to effect the operation of said switching means to transfer the motor circuits from the starting connections to the running connections.

7. In a starting system for a synchronous motor, in combination, a synchronous motor, starting connections for the motor, running connections for the motor, a source of alternating current, means for connecting the motor to said source of alternating current whereby said starting connections become energized, and control means, responsive to a given total number of revolutions of the motor, adapted to control the transfer of the motor from the starting connections to the running connections.

8. In a starting system for an alternating current motor, in combination, a motor, starting connections for the motor, running connections for the motor, a source of alternating current, means for connecting the motor to the source of alternating current whereby said starting connections become energized, and means, responsive to a given number of revolutions made by the motor after connection to said source of alternating current, adapted to effect a transfer of the motor connections from the starting connections to the running connections.

9. In a starting system for an alternating current motor, in combination, a motor, starting connections for the motor, running connections for the motor, a source of alternating current, means for connecting the motor to the source of alternating current whereby said starting connections become energized, means, responsive to a given number of revolutions made by the motor after connection to said source of alternating current, adapted to effect a transfer of the motor connections from the starting connections to the running connections and means for adjusting said last named means to thus effect the transfer at any selected number of revolutions of the motor.

10. In a starting system for a synchronous motor, in combination, a synchronous motor, starting connections for the motor, running connections for the motor, a source of alternating current, means for connecting the motor to said source of alternating current whereby said starting connections become energized, control means, responsive to a given total number of revolutions of the motor, adapted to control the transfer of the motor from the starting connections to the running connections, and means for adjusting said control means to thus effect the transfer at any selected total number of revolutions of the motor.

11. In a motor starter, the combination with an alternating current motor having circuits that include starting and running connections, a source of alternating current, switching means for effecting the energization of said motor and for effecting a transfer from the said starting connections to said running connections, control means responsive to the number of revolutions of the motor, after starting of the motor, adapted to effect the operation of said switching means to transfer the motor circuits from the said starting connections to the said running connections and means for adjusting said control means for any selected number of motor revolutions.

12. In a motor starting system of the type described, the combination with a motor having a field winding, a source of excitation for the field winding, a switch for connecting the field winding to said source of excitation, means for energizing the motor to start the motor, control means responsive to a given total number of revolutions of the motor, after starting of the motor, adapted to effect the operation of said switch to thus connect the field winding to the source of direct current, and means for adjusting the control means to thus be responsive to any given number of total motor revolutions.

13. In a motor starter, the combination of, a synchronous motor having an armature winding and a field winding, a source of alternating current, switching means for connecting the armature to the source of alternating current, a source of direct current, switching means for connecting the field winding to the source of direct current and control means, including a revolution counter set in operation the instant the source of alternating current is connected to the armature, adapted to cause the operation of the last named switching means when the motor has made a given total number of revolutions after the operation of the first named switching means and means for adjusting the revolution counter for different selected total number of revolutions.

14. In a starting control for automatically starting an electric motor, in combination, a synchronous motor having an armature winding and a field winding, means for applying alternating current to the armature winding, a source of direct current, a resistor, a two-position switch arranged so that in one position it connects said resistor across the field winding and in the other position it connects the source of direct current to the field winding, control means, responsive to a given total number of revolutions the motor makes after the armature is supplied with alternating current, adapted to disconnect said resistor from the field winding and to connect the source of direct current to the field winding, and means for adjusting the operating characteristics of said control means so that said control means is made responsive to any selected total number of revolutions the motor makes after energization with alternating current.

15. In a starting system for a synchronous motor having armature windings and field windings, a source of alternating current for the motor, said source having low-voltage starting taps and full-voltage running taps, a source of direct current, said field winding having a starting, or discharge circuit, connection and a running connection, field switching means adapted to transfer the field winding from the starting or discharge circuit connection to the running connection to be energized with direct current from said source of direct current, and control means responsive to a given total number of revolutions of the motor after connection to said low-voltage starting taps adapted to automatically control the transfer of the motor armature windings from the low-voltage starting taps to the full-voltage running taps, means responsive to a given total number of revolutions of the motor after connection to said low-voltage taps adapted to automatically effect operation of the field switching means to transfer the field winding connection from the discharge circuit connection to the connection energizing the field with direct current.

16. In a starting system for a synchronous motor having armature windings and field windings, a source of alternating current for the motor, said source having low-voltage starting taps and full-voltage running taps, a source of direct current, said field winding having a starting, or discharge circuit, connection and a running connection, field switching means adapted to transfer the field winding from the starting or discharge circuit connection to the running connection to be energized with direct current from said source of direct current, and control means responsive to a given total number of revolutions of the motor after connection to said low-voltage starting taps adapted to automatically control the transfer of the motor armature windings from the low-voltage starting taps to the full-voltage running taps, means responsive to a given total number of revolutions of the motor after connection to said low-voltage taps adapted to automatically effect operation of the field switching means to transfer the field winding connection from the discharge circuit connection to the connection energizing the field with direct current, and means for adjusting the control means to thus be responsive to any selected total number of motor revolutions.

17. In a starting system for a synchronous motor having armature windings, a source of alternating current for the motor, said source having low-voltage starting taps and full-voltage running taps, and control means responsive to a given total number of revolutions of the motor after connection to said low-voltage starting taps adapted to automatically control the transfer of the motor armature windings from the low-voltage starting taps to the full-voltage running taps, and means for adjusting the control means to thus be responsive to any selected total number of motor revolutions.

18. In a starting system for an alternating current motor, a source of alternating current therefor having low-voltage starting and full-voltage running taps, means responsive to the number of revolutions of the motor after starting adapted to automatically control the transfer of the motor armature from the low-voltage starting taps to the full-voltage running taps and means for adjusting said means responsive to the number of revolutions of the motor to make it responsive to any selected number of revolutions of the motor.

19. In a system for starting an alternating current motor, in combination, an alternating current motor, means for energizing the motor to start it, starting circuits for the motor adapted to become energized the instant the motor is energized for starting, a revolution counter adapted to become operative to count motor revolutions the instant the motor is started, running circuits for the motor, and control means responsive to a selected number of revolutions counted by the revolution counter adapted to energize the running circuits for the motor and to deenergize the starting circuits for the motor.

20. In a system for starting an alternating current motor, in combination, an alternating current motor, means for energizing the motor to start it, starting circuits for the motor adapted to become energized the instant the motor is energized for starting, a revolution counter adapted to become operative to count motor revolutions the instant the motor is started, running circuits for the motor, control means responsive to a selected number of revolutions counted by the revolution counter adapted to energize the running circuits for the motor and to deenergize the starting circuits for the motor, and means for adjusting the control means to be responsive to any selected total number of revolutions counted by the revolution counter.

FREDERICK AULD.